United States Patent
Mehrotra et al.

(10) Patent No.: US 12,517,768 B2
(45) Date of Patent: Jan. 6, 2026

(54) RESOURCE MANAGEMENT AND ISOLATION IN CONTAINERIZED WORKLOADS

(71) Applicant: MICROSOFT TECHNOLOGY LICENSING, LLC, Redmond, WA (US)

(72) Inventors: Sanjeev Mehrotra, Kirkland, WA (US); Bozidar Radunovic, Cambridge (GB); Xenofon Foukas, Cambridge (GB); Jon Larrea Martinez, Edinburg (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 337 days.

(21) Appl. No.: 18/138,720

(22) Filed: Apr. 24, 2023

(65) Prior Publication Data
US 2024/0354170 A1   Oct. 24, 2024

(51) Int. Cl.
*G06F 9/50* (2006.01)

(52) U.S. Cl.
CPC .......... *G06F 9/5083* (2013.01); *G06F 9/5033* (2013.01); *G06F 9/505* (2013.01)

(58) Field of Classification Search
CPC ...... G06F 9/5083; G06F 9/5033; G06F 9/505; G06F 2009/4557; G06F 9/45558
See application file for complete search history.

(56) References Cited

U.S. PATENT DOCUMENTS

| | | | | |
|---|---|---|---|---|
| 12,242,892 | B1* | 3/2025 | Burnett | G06F 9/45533 |
| 2022/0091904 | A1* | 3/2022 | Fawcett | G06F 9/5083 |
| 2023/0161631 | A1* | 5/2023 | Sharma | G06F 9/5044 |
| | | | | 718/104 |
| 2023/0244542 | A1* | 8/2023 | Gottipati | G06F 9/5077 |
| | | | | 718/1 |

OTHER PUBLICATIONS

CPU Management—CPU Pinning and Isolation in Kubernetes* Technology Guide (Year: 2021).*
Doern, et al., "opencontainers/runtime-spec", Retrieved From: https://github.com/opencontainers/runtime-spec/blob/main/config.md, Aug. 7, 2022, 25 Pages.
International Search Report and Written Opinion received for PCT Application No. PCT/US2024/023505, Jul. 1, 2024, 14 pages.
Joseph Heck, "Kubernetes for Developers", Use Kubernetes to develop, test, and deploy your applications with the help of containers, Jan. 1, 2018, 400 pages.

(Continued)

*Primary Examiner* — Sisley N Kim
(74) *Attorney, Agent, or Firm* — Han Gim; Newport IP, LLC

(57) ABSTRACT

Techniques are disclosed for managing resources in a computing network comprising a plurality of computing nodes and an orchestrator. Resources are identified that are available for use by workloads to be executed in the computing network. The resources are partitioned into resource classes and exposed to the computing nodes. When a requested resource is reserved for exclusive use, the partitioning of the resources is updated.

20 Claims, 10 Drawing Sheets

(56) References Cited

OTHER PUBLICATIONS

Philip, et al., "CPU Management—CPU Pinning and Isolation in Kubernetes* Technology Guide", Intel Corporation, Retrieved from the Internet URL: https://networkbuilders.intel.com/solutionslibrary/cpu-pin-and-isolation-in-kubernetes-app-note, Jan. 20, 2021, pp. 1-24.

Samdanis, et al., "Slicing and Radio Resource Management: The Essential 5G Reference Online", Wiley 5G Ref: The Essential 5G Reference Online, Dec. 29, 2019, pp. 1-19.

International Preliminary Report on Patentability received for PCT Application No. PCT/US2024/023505, mailed on Nov. 6, 2025, 09 pages.

* cited by examiner

RESOURCE MANAGEMENT AND ISOLATION IN CONTAINERIZED WORKLOADS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use a container orchestration system for application deployment, scaling, and management, such as Kubernetes. In some cases, it may be desired to more efficiently manage resources and devices needed to run containerized workloads. It is with respect to these considerations and others that the disclosure made herein is presented.

SUMMARY

The disclosure provides techniques and methods for managing resources and devices needed to run containerized workloads. The techniques allow for partitioning of resources into different classes as well as techniques for advertising resources, as well as accounting for the resources. Additionally, techniques for isolating resources from other containers are described along with techniques for configuring devices assigned to the containers.

The disclosed embodiments allow specialized workloads (such as virtualized radio access networks (vRANs)) to more efficiently run on container orchestration systems. These specialized workloads often have very specific device requirements and resource requirements. They also often require manual tuning which is a function of the device being used by the workload (e.g., Peripheral Component Interconnect (PCI) bus addresses of devices being used).

The disclosure pertains to scheduling and management of resources in a way that is not provided by existing orchestration systems such as Kubernetes. An orchestration system, also referred to as an orchestrator, is a system for deploying and managing containerized applications. Orchestrators set up, monitor, and tear down containers, as well as ensure that hardware resources are assigned to each of the containers. Existing container orchestration systems typically treat central processing unit (CPU) and memory as the only resources that can be scheduled. However, this can be insufficient for workloads that require specific levels of performance for a given application.

For example, some applications require low latency or low jitter, or minimal variations in how long it takes to process a task. In many orchestration systems, when running CPUs on workloads, the operating system (OS) and other processes can also share the CPU with other processes, which can lead to variation in how long it takes to process a task. In another example, when certain components of a vRAN are running on different nodes in a cluster, and if it is desired to transfer data samples over the network, then higher than desired latencies can result because of the OS overhead. For the former case, an isolated CPU core is typically used instead of using any CPU core that is available. An isolated core is one which is not available for the scheduler to generally offer or advertise as a resource. Thus, only one thread is pinned to such a core and only that thread is able to utilize that core. For the latter case, one way to address the issue is to use a Data Plane Development Kit (DPDK) or similar approaches to achieve lower latencies. The above are two examples of resources that are not typically advertised and scheduled in a typical orchestration framework.

The present disclosure describes a way to provide mechanisms for advertising resources in a containerized environment using plugins. Plugins can be used to identify and manage available resources, improve the performance of workloads, and provide a framework for managing and scheduling these resources as well as utilizing the resources by the workload.

In an example, isolated CPU cores are advertised as separate resources. A number of CPU cores to be isolated are identified, such that when the system boots up, these isolated cores are not available for general use. The orchestration system is notified so that when resources are advertised, the isolated cores are not generally advertised in the same way as other resources. Rather, the isolated cores are advertised as available for eligible workloads. Instead of having the orchestration system advertise isolated cores, device plugins are used to advertise these isolated cores. In an embodiment, the device plug-in is configured to manage and allow eligible workloads to use the isolated cores. The device plug-in excludes the isolated cores from OS scheduling as well as scheduling by the orchestration system.

In addition to isolating a number of CPU cores, the disclosed techniques allow for management of the isolated resources. In one example, resources can be made available to some processes but not to other processes. Resources can be made available based on scheduling policies, for example. In an embodiment, subsets of resources can be designated for specified purposes. The subsets can be mutually exclusive or overlap. In an embodiment, scheduler plugins of an orchestration system can be used to manage resource sets. The scheduler plugins can be used to manage resource status and availability. For example, a resource can be listed in two different subsets, and the resource status is updated with regard to both subsets as resources are allocated.

The disclosure also provides a way to launch a given workload when an isolated resource is being used and to ensure that the isolation is maintained. In an embodiment, when a node launches the workload, the runtime call is intercepted and overridden with a custom binary. The custom binary updates a configuration file that is used to launch a container. The configuration file may be modified based on information provided by the plugins. In some scenarios, runtimes do not launch a container directly on the host but on a virtual machine (VM). The disclosed techniques can intercept the call that creates the VM and then creates the container on the VM. The disclosed framework can be used to continue to manage resources after the container is launched.

Once the container launches, the application running inside that container utilizes the assigned resources automatically. In an embodiment using Kubernetes, webhook mutation can be used by auto-injecting an initialization container into the pod. The initialization container can view the workload that is being launched and determine which configuration files need to be modified.

The described techniques allow data centers to operate more efficiently by increasing utilization of shared resources such as processing cores, providing for greater operational efficiency for service providers.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
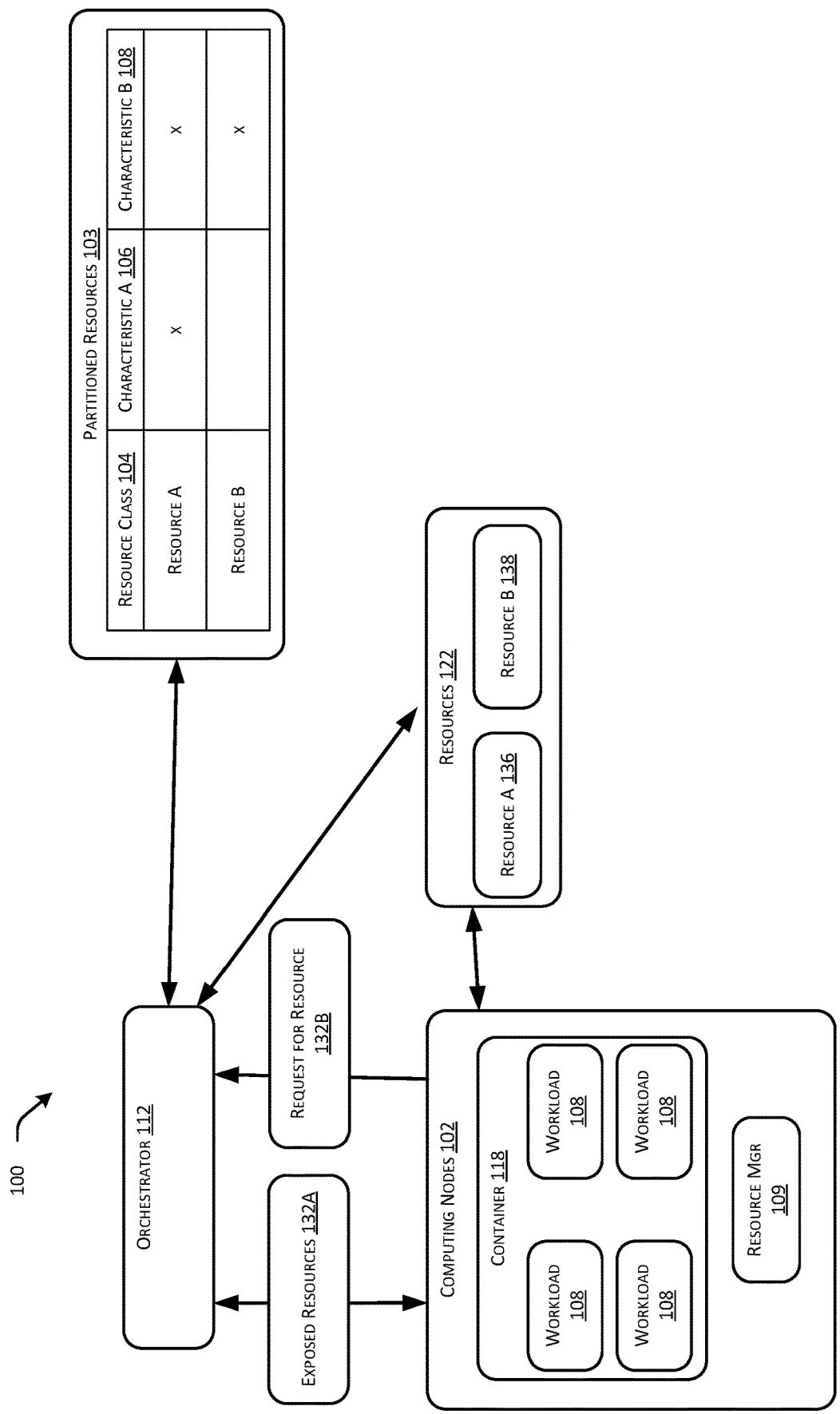
FIG. 1A illustrates an example implementation in an orchestration system in accordance with the present disclosure.

Resource management is a challenging and important issue for running containerized workloads. A container orchestration system must keep track of what resources are available on the nodes of the computing environment and managing resource requests from containers to determine workload placement. In addition to workload placement, the orchestration system needs to notify containers as to which resources are available as well as ensure that the container does not use resources that are not assigned to the container.

Resource management can be increasingly challenging as the number and types of resources increases. For example, in addition to CPU and memory, additional resources such as huge pages, network interfaces, and accelerators (e.g., FPGA, ASIC) are often needed by the workloads. Resource management can become more challenging as each resource may have different classes with differing characteristics.

For example, CPU resources can include isolated CPU cores which are isolated from general scheduling by the OS. Additionally, some CPUs may operate at different frequencies resulting in differing energy usage. Some CPUs can be assigned to different systemd slices so that other processes cannot interfere with these CPUs. Furthermore, the CPUs may be completely different CPU types. In addition, some of the described characteristics can be modifiable at runtime. For example, the same CPU can be dynamically moved from one systemd slice to another or its p-state or c-state can be modified.

For network interfaces and accelerators, some can be virtual functions (VFs) created from different physical functions (PFs) providing Single Root I/O Virtualization (SR-IOV). Some network interfaces and accelerators can be bound to a particular driver (e.g., virtual function I/O (vfio-pci)), while other network interfaces and accelerators are bound to another driver (for example iavf). Some VFs may come from a physical device which only has connectivity to particular switches. For example, there may be multiple network interfaces, but only some are connected to the fronthaul of the RAN.

For accelerators, a particular configuration of the accelerator may be desired depending on the workload. For example, a workload may require the accelerator VF to have a particular queue depth in order to operate properly.

The following Detailed Description describes technologies for managing resources and devices when running containerized workloads. The techniques allow for partitioning of resources into different classes, advertising the resources, and accounting for the resources. Additionally, techniques to isolate resources from other containers are described along with techniques to configure devices assigned to containers.

The disclosed embodiments allow specialized workloads (such as vRAN) to run on container orchestration systems. These specialized workloads often have very specific device requirements and resource requirements. The specialized workloads also often require manual tuning which is a function of the device being used by the workload (e.g., PCI bus addresses of devices being used).

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Resources can generally be classified into the following types:

Fully configurable—For example, an accelerator VF may be fully configurable so that any process that needs the accelerator VF can use it with proper configuration if needed.

Partially configurable—For example, CPUs can be classified as being able to operate in one or more possible states. These states can include power states (p-states), systemd slices, and the like. For example, if cores are classified as isolcpus (CPUs completely isolated from the system) or non-isolated, the non-isolated cores can run in different systemd slices to isolate them from other processes. The set of systemd slices on which the non-isolated cores can run can be different for each core.

Table 1 below illustrates example CPU types. Since the "CPU Type" for core IDs are overlapping (e.g., core ID 1 can run on systemd slice "A" and "B" and core ID 2 can run on "B" and "C"), these core IDs cannot be differentiated into different classes of CPU.

| | CPU Type | | | |
|---|---|---|---|---|
| Core ID | isolcpu | systemd slice A | systemd slice B | systemd slice C |
| 0 | X | | | |
| 1 | | X | X | |
| 2 | | | X | X |
| 3 | | X | X | X |

Non-configurable: Some resources are non-configurable. For example, an isolcpu core cannot be reconfigured since it is decided at boot-time. As another example, if a network interface is only plugged into the fronthaul, then it cannot be reconfigured to provide access to the mid-haul components.

For devices and resources that are fully configurable and those that are non-configurable, these devices and resources can be advertised as separate resources. In an example, if there are only isolcpus and non-isolcpus, then in addition to SR-IOV network interface cards (NICs), some are connected to the fronthaul and some are connected to the midhaul. In addition, those that are connected to the midhaul resources are further divided into those which are bound to DPDK drivers (vfio-pci), and those which are bound to non-DPDK (iavf). The resources can be advertised as the follows:
 cpu: "7"
 plugin.io/isolcpus: "23"
 intel.com/fh_dpdk: "4"
 intel.com/mh_dpdk: "4"
 intel.com/mh_socket: "4"
 intel.com/intel_fec_acc100: "1"

In the above example, "cpu" represents the non-isolated CPU cores, "plugin.io/isolcpus" represents the isolated CPU cores, "intel.com/fh_dpdk" represents the fronthaul NIC interfaces, "intel.com/mh_dpdk" represents the midhaul DPDK interfaces (bound to the vfio-pci driver), "intel.com/mh_socket" represents the socket interfaces (bound to the iavf) driver, and "intel.com/intel_fec_acc100" represents the accelerator.

Since each resource is represented separately, the number of each resource that is needed in the container workload can be requested as resource requests. The requested resources can be scheduled onto a node where there are a sufficient number of resources.

In an example where some resources have overlapping types as shown in Table 1, the available resources for the CPU can be represented using the following:
 plugin.io/isolcpus: "1"
 plugin.io/systemd-slice-a-cpu: "2"
 plugin.io/systemd-slice-b-cpu: "3"
 plugin.io/systemd-slice-b-cpu: "2"

One issue is that if a container workload requests a CPU of "systemd-slice-a-cpu" type, depending on which CPU is assigned, its removal from other types needs to be accounted for. For example, if a container workload requests 1 CPU of "systemd-slice-a-cpu" type and is assigned CPU with Core ID 3, then the following becomes the number of available resources:
 plugin.io/isolcpus: "1"
 plugin.io/systemd-slice-a-cpu: "1"
 plugin.io/systemd-slice-b-cpu: "2"
 plugin.io/systemd-slice-b-cpu: "1"

The above results are due to Core ID 3 providing a contribution to all three types.

As discussed, some resources (such as a CPU) can have multiple features. For example, a feature can be defined as some parameter of the resource having some value, or the resource belonging to a particular set.

A type of resource R can be defined to have a set of features $\mathcal{F}_R$. Every resource on a node $(r_1, r_2, \ldots, r_N)$ of resource type R on the node can either have or not have the features in set $\mathcal{F}_R$. The resource set of feature f can be defined to be $\mathcal{R}_f$ as the set of resources of type R which have feature $f \in \mathcal{F}_R$.

The following algorithm can be used to minimize the set of features to be advertised by merging identical sets. In the following, the objective is to find the set $\mathcal{F}_R'$ which is the set of features to be removed from advertisement and scheduling.

$$\mathcal{F}_R' = \varnothing$$

for $f^0 \in \mathcal{F}_R$:

for $f^1 \in \mathcal{F}_R$:

if $f^0 \notin \mathcal{F}_R'$ and $f^1 \notin \mathcal{F}_R'$ and $(f^0 = f^1$ on all nodes in cluster):

$$\mathcal{F}_R' \leftarrow \mathcal{F}_R' \cup \{f^1\}$$

In an example, a CPU can have feature A, B, C, or D, and these features can correspond to the CPU having a parameter with a particular value. For example, having feature "A" may mean that the CPU core has FIFO scheduling, or it may correspond to allowing processes which are going to run on a particular systemd slice as in Table 1.

| Feature | CPU | | | |
|---|---|---|---|---|
| Core ID | Feature A | Feature B | Feature C | Feature D |
| 0 | X | x | | |
| 1 | x | X | X | |
| 2 | | | X | X |
| 3 | | | X | X |

In this example shown in Table 2 above, it is noted that it is not possible to have a core which has feature B, but not feature A. That is, the set of cores which have feature A is identical to set of cores which have feature B. If this condition holds true for all nodes in the cluster, then there is no point requesting feature B as a standalone feature. Thus feature B as a standalone feature can be removed to minimize the unique sets of features being advertised on the node. Thus,
 plugin.io/cpu-feature-A: "2"
 plugin.io/cpu-feature-B: "2"
 plugin.io/cpu-feature-C: "3"
 plugin.io/cpu-feature-D: "2"
  can be replaced with the following.
 plugin.io/cpu-feature-A: "2"
 plugin.io/cpu-feature-C: "3"
 plugin.io/cpu-feature-D: "2"

A request for a resource with certain features may be made by the workload. For example, the workload may request one CPU with feature A.

The advertisement procedure described above may be sufficient for simpler scenarios where a node can be identified which has sufficient CPU cores with feature A and the workload can be assigned to that node. However, depending on which core is assigned to the workload, the available resources will be different. For example, if Core "0" is assigned to the workload, then the availability becomes the following for the node.

plugin.io/cpu-feature-A: "1"
plugin.io/cpu-feature-C: "3"
plugin.io/cpu-feature-D: "2"

However, if Core 1 is assigned, the availability becomes the following:

plugin.io/cpu-feature-A: "1"
plugin.io/cpu-feature-C: "2"
plugin.io/cpu-feature-D: "2"

In addition, if multiple cores are available which are able to meet the feature request, the core which belongs to the smaller number of resource sets can be selected. This allows the sum of the available cores being advertised to be maximized.

For example, if Core 0 and Core 1 are available, Core 0 can be assigned instead of Core 1 since assignment using Core 1 also removes one core's availability from cpu-feature-c, whereas using core 0 does not remove a core's availability from cpu-feature-c. This is desirable since if another workload requests cpu-feature-c, there will still be resources available that have the desired feature. This corresponds to selecting the core which belongs to the least number of resource sets (and maximizing the number of resource sets that remain available).

More complicated requests may also be accommodated. For example, a request can be made for 2 CPUs with (feature A and (feature B or not feature C)). Using Boolean operations, the request can be written as a series of OR conditions. For example, the condition feature A and (feature B or not feature C) can be written using the following:

$$A \wedge (B \vee \neg C) = (A \wedge B) \vee (A \wedge \neg C)$$

In addition, one more CPU with just feature A may be requested.

If there are four features being advertised (A, B, C, D), the two workload resource requests for CPUs can be written as a series of binary bitmasks such as the following, which in one embodiment is written using YAML.

requests:
  quantity: 2
  type: cpu
  features:
    mask: 1100
    value: 1100
    mask: 1010
    value: 1000
  quantity: 1
  type: cpu
  features:
    mask: 1000
    value: 1000

The above request can be interpreted as "requests" being an array of resource requests for the workload, with "requests.[i].type" representing the type of resource being requested, and "requests[i].quantity" being the number of these resources being requested. "requests.[i].features" is an array of potential features which qualify as matching the request. "requests.[i].features.[j].mask" represents the mask of the features to identify in the potential matching condition for the request and "requests.[i].features.[j].value" represents the desired value.

That is, for the first potential match for the first request $(A \wedge B)$, only features A and B are relevant since the mask is "1100" (ABCD). In addition, feature A should be present and feature B should be present to qualify as a match. Another potential match $(A \wedge \neg C)$ for this request has a mask (1010) meaning only features A and C are considered. The value here is (1000) meaning that feature A should be present and feature C should not be present to qualify as a match.

For the second request, one CPU core is needed. In this case, the only potential match is for feature A to be present.

For such more complicated scheduling, a scheduler can be provided with the features present on each CPU on the node. This can be expressed as an array of bitmasks.

For example, the availability advertised for Table 3 below can be:

| Feature | CPU | | | |
| --- | --- | --- | --- | --- |
| Core ID | Feature A | Feature B | Feature C | Feature D |
| 0 | X | x | | |
| 1 | X | X | X | |
| 2 | | X | X | X |
| 3 | | | X | X |

The following can be used to implement the advertisement of resource type and features of each resource on a node.

node_n:
  cpus:
    value: 1100
    value: 1110
    value: 0111
    value: 0011

In this example, instead of "cpus" being a quantity, cpus.[i].value represents the binary bitmask value of features of "i"th core on node_n.

In an embodiment, the orchestration scheduler can perform the following operations to determine whether a node can meet the resource requests of the workload as well determine which node and which resources of the node to utilize for each request made by the workload. In an example, resource requests with a quantity>1 are expanded, to be repeated into the "arrayOfRequests" listed below. In an example, the above requests can be listed as shown in the following. That is, the "quantity" field of each request is removed, and if the quantity was greater than 1, the request is repeated multiple times. The "arrayOfRequests" is length 3 for this workload.

The following statements illustrate an example of a complex resource request. Similar resource requests may be repeated to request a particular quantity.

requests:
  type: cpu
  features:
    mask: 1100
    value: 1100
    mask: 1010
    value: 1000
  type: cpu
  features:
    mask: 1100
    value: 1100 mask: 1010
value: 1000
type: cpu
features:
  mask: 1000
  value: 1000

---
Algorithm 1
---
```
bestNodeScore = -1
nodeToUse = None
resourcesToUse = None
for node in setOfNodes:
    nodeScore = 0
    resourceRequestsSatisfied = True
    resourcesFromNode = [ ]
    for resourceRequest in arrayOfResourceRequests:
        resourceScore = -1
        resourceToUse = None
        for resource in node[request.type]:
            if not resourceAssignedToAnotherWorkload(resource):
                for matchCriteria in request.features:
                    if (matchCriteria.mask & (resource.value ^ matchCriteria.value) ) == 0:
                        score=(numberOfFeatures[request. type]-numberOfOnesInMask(resource.value) )
                        if score > resourceScore:
                            resourceScore = score
                            resourceToUse = resource
        if resourceToUse is not None:
            nodeScore += resourceScore
            resourcesFromNode.add(resource)
        else:
            resourceRequestsSatisfied = False // node does not have a resource for request
            break
    if resourceRequestsSatisfied and nodeScore > bestNodeScore:
        bestNodeScore = nodeScore
        nodeToUse = node
        resourcesToUse = resourcesFromNode
setResourcesToUsed(resourcesToUse)
```
---

The function "setResourcesToUsed" sets a flag to keep track of which resources on each node are being used and the function "resourceAssignedToAnotherWorkload" returns that flag for the resource. Once the workload is removed, the flag is cleared so that the resource is usable by another workload.

In order to check if a resource satisfies a request, the following can be used in the above described algorithm. "&" represents "bitwise and": "^" represents "bitwise xor".

matchCriteria.mask & (resource.value^matchCriteria.value)

In an embodiment, the following score function can be implemented:

score=(numberOfFeatures[request.type]-numberOfOnesInMask(resource.value))

In the above, numberOfOnesInMask counts the number of 1s in the binary representation and numberOfFeatures represents the number of features for the resource type being referenced in the request. The scoring function finds resources which belong to the minimal number of resource sets so that resources/devices which belong to the larger number of resource sets remain available for other workload requests. As an example, if there are four features (A, B, C, and D), then a resource which belongs to 3 resource sets will return a score of "1" and a resource which belongs to only one resource set will return a score of "3". The above is one example of a scoring function, and other scoring functions can be implemented.

The computation "matchCriteria.mask & (resource.value^matchCriteria.value)" should be zero for a match. In an example, the following two allowable feature matches are made in the request.

features:
  mask: 1100
  value: 1100
  mask: 1010
  value: 1000

The following resources are available on node_n:
cpus:
  value: 1100
  value: 1110
  value: 0111
  value: 0011

In this example, the first match for the request is (A∧B), so the first 2 CPUs match. matchCriteria.mask & (resource.value^matchCriteria.value) for each resource provides:

1100 & (1100 ^1100)=0000//score for this is 4-2=2→selected
1100 & (1110 ^1100)=0000//score for this is 4-3=1
1100 & (0111 ^1100)=1000//score-1 (no match)
1100 & (0011 ^1100)=1100//score-1 (no match)

For the second possible match (A∧¬C), only core 0 satisfies the feature request, and the following results are generated:

1010 & (1100 ^1000)=0000//score for this is 4-2=2
1010 & (1110 ^1000)=0010//score-1 (no match)
1010 & (0111 ^1000)=1010//score-1
1010 & (0011 ^1000)=1010//score-1

Both cores 0 and 1 are assignable on this node (core 0 matches both, core 1 matches one), but core 0 has a higher score and can be selected. Thus, if this node has the highest score, then the workload is placed on this node.

FIG. 1A illustrates a computing network 100 comprising a plurality of computing nodes 102 and an orchestrator 112.

Resources 122 are available for use by workloads 108 to be executed in the computing network 100. In an embodiment, the workloads are executed by containers 118. Resources 122 can include, in this example, resource A 136 and resource B 138. The resources 122 are partitioned into resource classes 104. Each of the resource classes 104 are associated with one of the resources 122 and a characteristic of the resources such as characteristic A 106 or characteristic B 108. The partitioned resources 103 can be exposed to the computing nodes 102 as exposed resources 132A. In an embodiment, the exposed resources 132A are exposed by the orchestrator 112, for example to the computing nodes 102. In some embodiments, the exposed resources 132A are exposed to the orchestrator 112, for example by a resource manager 109. In response to receiving a request 132B from one of the computing nodes 102 to use one of the resources, the orchestrator reserves the requested resource for use by the computing node 102 that sent the request 132B. The requested resource is reserved for exclusive use for workloads 108 executed by the computing node 102 that sent the request 132B.

Figure 1B:
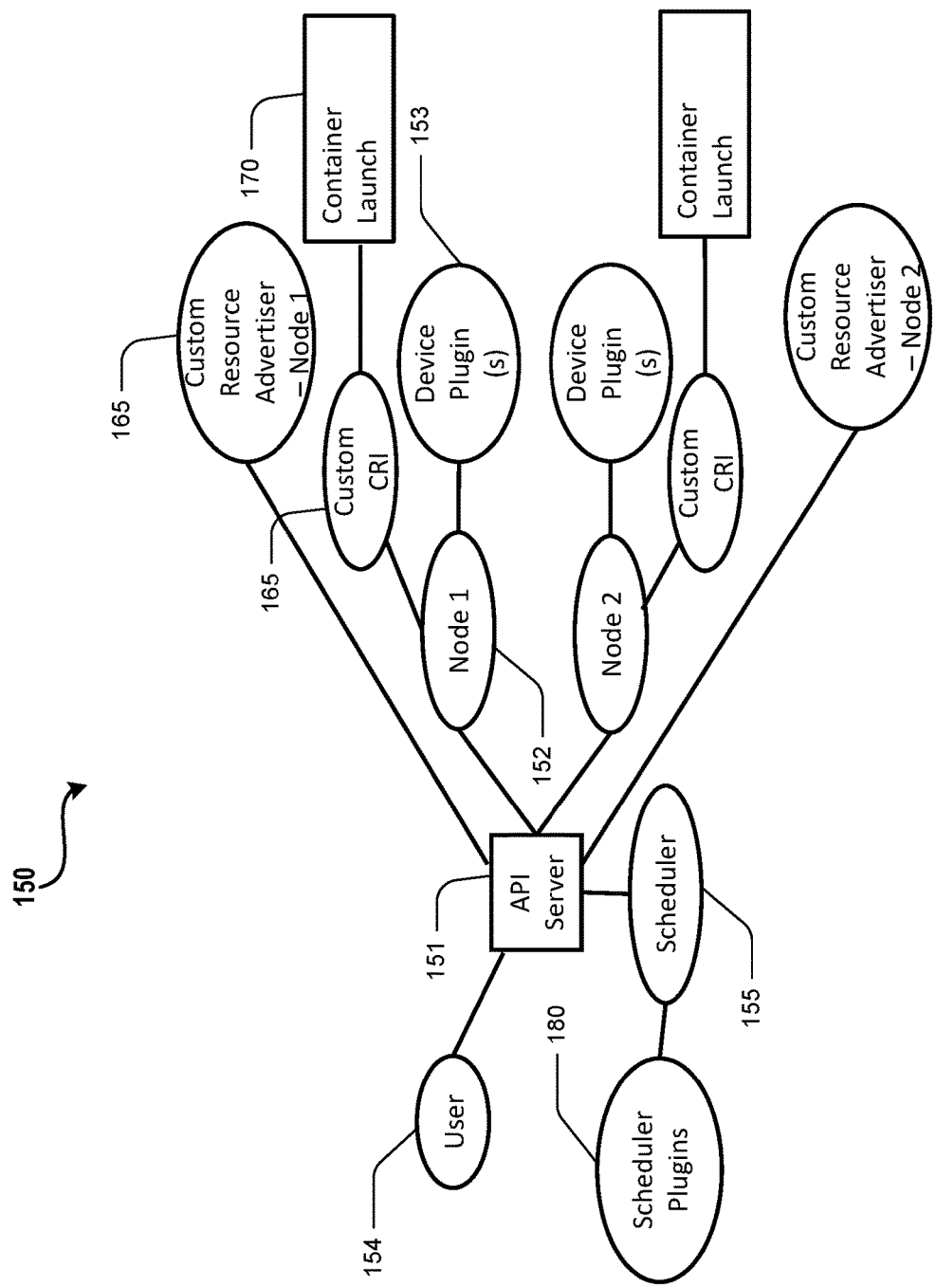
FIG. 1B illustrates an example implementation in an orchestration system in accordance with the present disclosure.

Container orchestration systems typically provide a device plugin framework for extending the advertisement and accounting for resources/devices. Referring to FIG. 1B, illustrated is an example Kubernetes orchestration system 150. An application programming interface (API) server 151 provides an API with which components such as user 154, scheduler 155, nodes 152, etc.) interact. The nodes 152 advertise standard resources (e.g., CPU and memory). The device plugins 153 advertise other resources which can be used to extend the resources to non-native Kubernetes resources. A custom container runtime interface (CRI) 165, as further discussed below, is used to provide a configuration to ensure that the correct resources are used by containers during container launch 170. Device plugins 153 are used to advertise resource sets and to manage and allow eligible workloads to use the resource sets. Scheduler plugins 180 operate with the scheduler 155 to manage resource sets. The scheduler plugins 180 can be used to manage the resource status and availability. A custom advertiser 165 is inserted into each node 152 which advertises the resource sets.

Using such a framework, additional resources can be advertised which the standard node does not advertise (e.g., NICs, accelerators). For other resources such as CPUs, resources can be removed from the standard advertisement pool and assigned to other resources. For example, a node may have 32 CPUs, where 24 are isolated CPU cores. Those 24 isolated cores can be reserved so that the node is not allowed to advertise them as standard CPUs. Instead, the device plugin is used to advertise the 24 isolated cores as separate resources. In this way, standard resources are partitioned into subclasses so that container workloads which require the resources can request them.

Without implementing the described techniques, there would be no way for a container workload to be assigned isolated CPU cores as the scheduler does not keep track of isolated CPU cores as a separate resource. In addition, by using a combination of device plugins as well as scheduler plugins, the accounting for resources can be modified as described herein.

Figure 2:
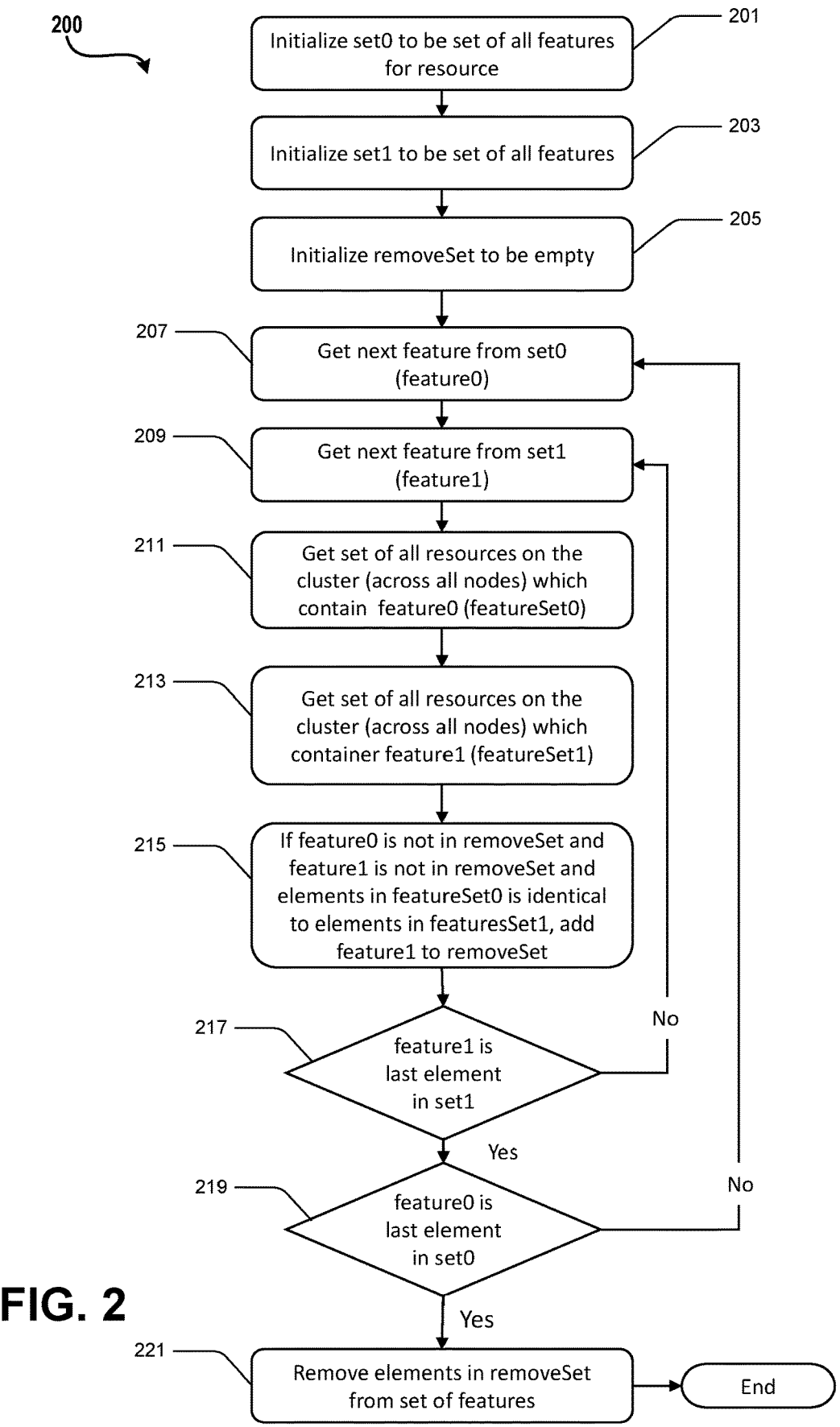
FIG. 2 illustrates an example implementation in accordance with the present disclosure.

After the number of features for each resource type is minimized using the algorithm shown in FIG. 2, at least three different variations can be considered for implementing into the scheduling framework. FIG. 2 illustrates a process 200 to minimize the number of resource sets for a resource. Operation 201 illustrates initializing set to be the set of all features for a resource. Operation 203 illustrates initializing set1 to be the set of all features. Operation 205 illustrates initializing removeSet to be empty. Operation 207 illustrates retrieving the next feature from set0 (feature0). Operation 209 illustrates retrieving the next feature from set1 (feature1).

Operation 211 illustrates retrieving the set of all resources on the cluster (across all nodes) which contain feature0 (featureSet0). Operation 213 illustrates retrieving the set of all resources on the cluster (across all nodes) which contain feature1 (featureSet1). Operation 215 illustrates that if feature0 is not in removeSet and feature1 is not in removeSet and elements in featureSet0 are identical to elements in featuresSet1, add feature1 to removeSet.

Operation 217 illustrates determining if feature1 is the last element in set1. If feature1 is not the last element in set1, then the procedure returns to operation 209. If feature1 is the last element in set1, then operation 217 is followed by operation 219 which illustrates determining if feature0 is the last element in set0. If feature is not the last element in set0, then the procedure returns to operation 207. If feature0 is the last element in set0, then operation 219 is followed by operation 221 which illustrates removing elements in removeSet from the set of features.

Figure 3:
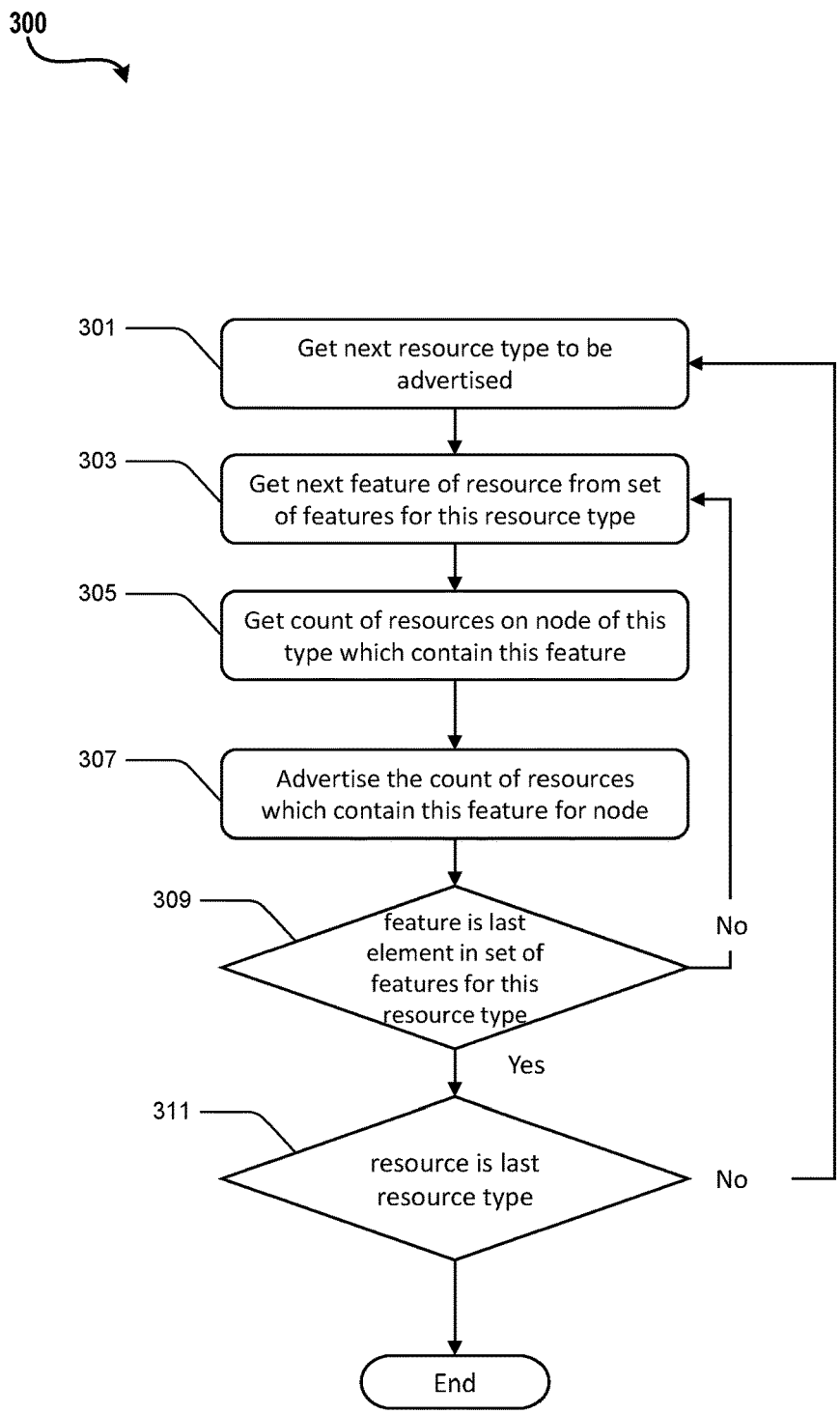
FIG. 3 illustrates an example implementation in accordance with the present disclosure.

Non-overlapping resource sets: In this variation, the device plugin framework and standard scheduler of orchestration frameworks such as Kubernetes can be used. Each resource set of a resource type is advertised as a separate resource as shown in FIG. 3. FIG. 3 illustrates a process 300 to advertise resources on a node, including a simple advertisement of resources which have certain features. The scheduler selects a node with sufficient resources as requested and proceeds. Operation 301 illustrates retrieving the next resource type to be advertised. Operation 303 illustrates retrieving the next feature of a resource from a set of features for this resource type.

Operation 305 illustrates retrieving a count of resources on a node of the resource type which contain the next feature. Operation 307 illustrates advertising the count of resources which contain this feature for the node. Operation 309 illustrates determining if the feature is the last element in the set of features for this resource type. If the feature is not the last element in the set of features for this resource type, then operation 309 is followed by operation 303. If the feature is the last element in the set of features for this resource type, then operation 309 is followed by operation 311.

Operation 311 illustrates determining if the resource is the last resource type. If the resource is not the last resource type, then operation 311 is followed by operation 301. If the resource is the last resource type, then the procedure ends.

Overlapping resource sets: Here the number of resources belonging to each resource set is advertised by the device plugin as a separate resource as shown in FIG. 3. A scheduler plugin is implemented to operate in conjunction with the default scheduler. This scheduler plugin implements the algorithm shown in FIG. 4 to find the best node and the resources on that node which provide the best score.

Figure 4:
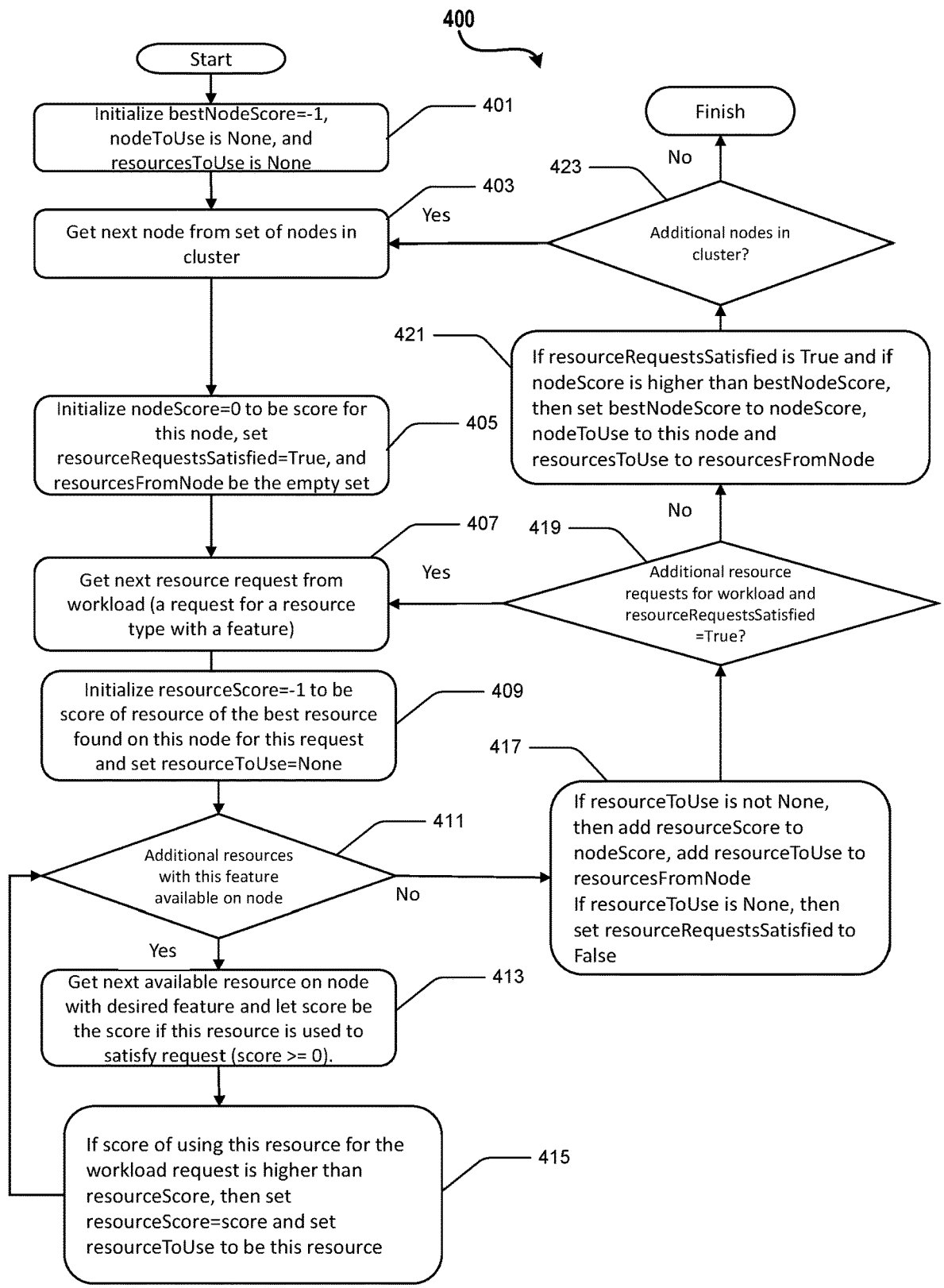
FIG. 4 illustrates an example implementation in accordance with the present disclosure.

FIG. 4 illustrates a process 400 to schedule workloads with simple requests for features on resource type (resource requests can be represented as a count of resources needed with particular feature (for example two CPUs with feature A). If so, this can be represented as repeated identical requests (for example two requests for CPUs with feature A). This information (such as the resources/devices to use on the node) can be written by the scheduler plugin into extendible fields such as pod annotations. Scoring is optional and, in some embodiments, all resources in the required resource set can be considered to have the same score. In this embodiment, a custom container runtime interface (CRI), as further discussed below, can be used to provide a configuration to ensure that the correct resources are used by the container.

Referring to FIG. 4, operation 401 illustrates initializing bestNodeScore=−1, nodeToUse to None, and resourcesToUse to None. Operation 403 illustrates retrieving the next node from a set of nodes in a cluster. Operation 405 illustrates initializing nodeScore=0 to be the score for this node, setting resourceRequestsSatisfied=True, and resourcesFromNode to be the empty set. Operation 407 illustrates retrieving the next resource request from a workload (a request for a resource type with a feature). Operation 409 illustrates initializing resourceScore=−1 to be the score of a resource of the best resource found on this node for this request and setting resourceToUse=None.

Operation 411 illustrates determining if additional resources with this feature are available on the node. If additional resources with this feature are not available on the node, then operation 411 is followed by operation 417. If additional resources with this feature are available on the node, then operation 411 is followed by operation 413 which illustrates retrieving the next available resource on the node with the desired feature and allowing the score to be the score if this resource is used to satisfy the request (score>=0).

Operation 415 illustrates that if the score of using this resource for the workload request is higher than resourceScore, then resourceScore-score and set resourceToUse to be this resource.

Operation 417 illustrates that if resourceToUse is not None, then add resourceScore to nodeScore, and add resourceToUse to resourcesFromNode. If resourceToUse is None, then set resourceRequestsSatisfied to False.

Operation 419 illustrates determining if there are additional resource requests for the workload and resourceRequestsSatisfied=True. If there are additional resource requests for the workload and resourceRequestsSatisfied=True, then operation 419 is followed by operation 407. Otherwise, operation 419 is followed by operation 421 which illustrates that if resourceRequestsSatisfied is True and if nodeScore is higher than bestNodeScore, then set bestNodeScore to nodeScore, set nodeToUse to this node, and set resourcesToUse to resourcesFromNode.

Operation 423 illustrates determining if there are additional nodes in the cluster. If there are additional nodes in the cluster, then operation 423 is followed by operation 403. If there are no additional nodes in the cluster, then the procedure completes.

Figure 5:
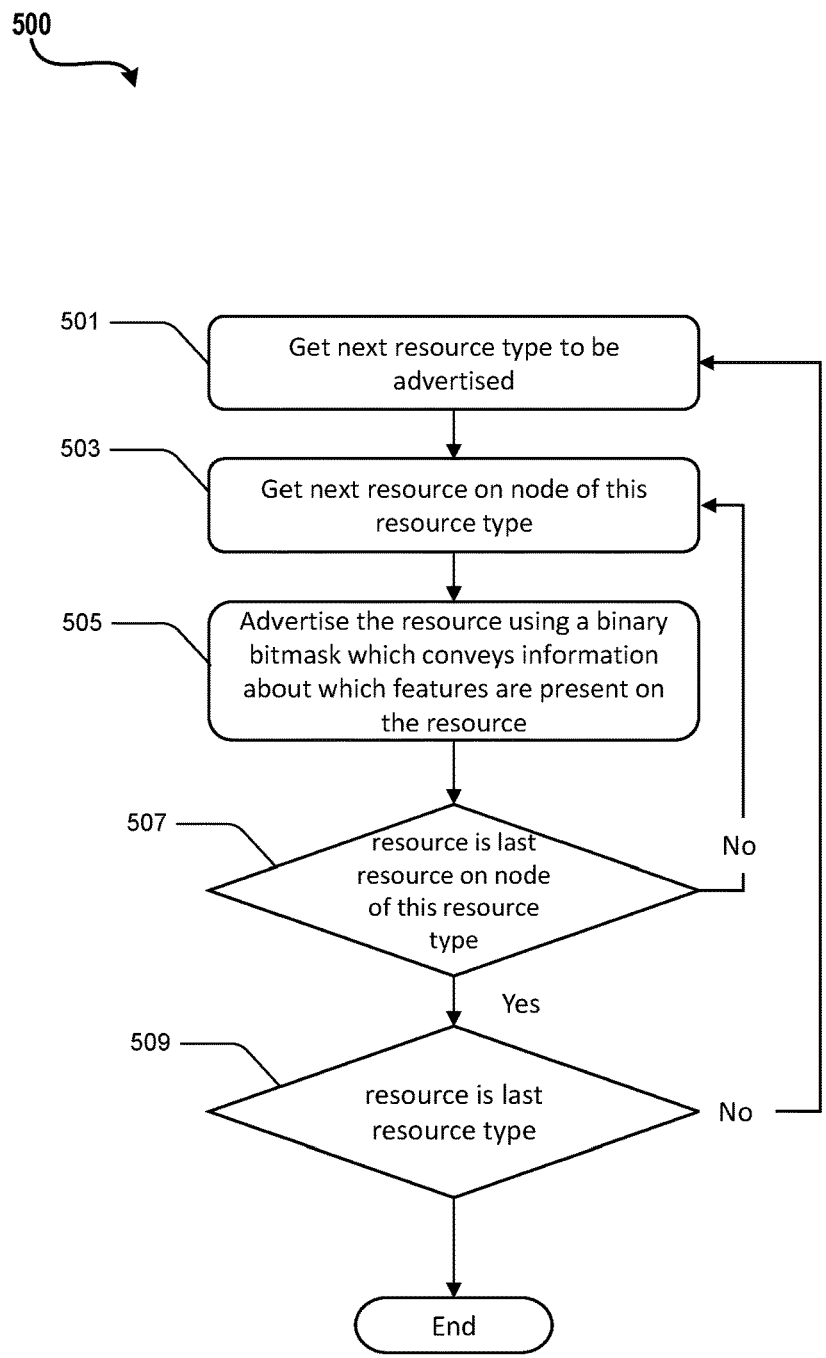
FIG. 5 illustrates an example implementation in accordance with the present disclosure.

Complex resource requests: In this scenario, in order to ensure requests are being met, both the request and advertisement of the resources may require significant modifications. In an embodiment, in a Kubernetes framework a combination of custom advertisers, scheduler plugins, and custom container runtimes may be used. A custom advertiser is inserted into each node which advertises resources using the flowchart in FIG. 5 and the example code block above. FIG. 5 illustrates a process 500 to advertise resources on a node for a more complicated advertisement. Operation 501 illustrates retrieving the next resource type to be advertised. Operation 503 illustrates retrieving the next resource on a node of this resource type.

Operation 505 illustrates advertising the resource using a binary bitmask that conveys information about which features are present on the resource. Operation 507 illustrates determining if the resource is the last resource on the node of this resource type. If the feature is not the last resource on the node of this resource type, then operation 507 is followed by operation 503. If the resource is the last resource on the node of this resource type, then operation 507 is followed by operation 509.

Operation 509 illustrates determining if the resource is the last resource type. If the resource is not the last resource type, then operation 509 is followed by operation 501. If the resource is the last resource type, then the procedure ends.

Figure 6:
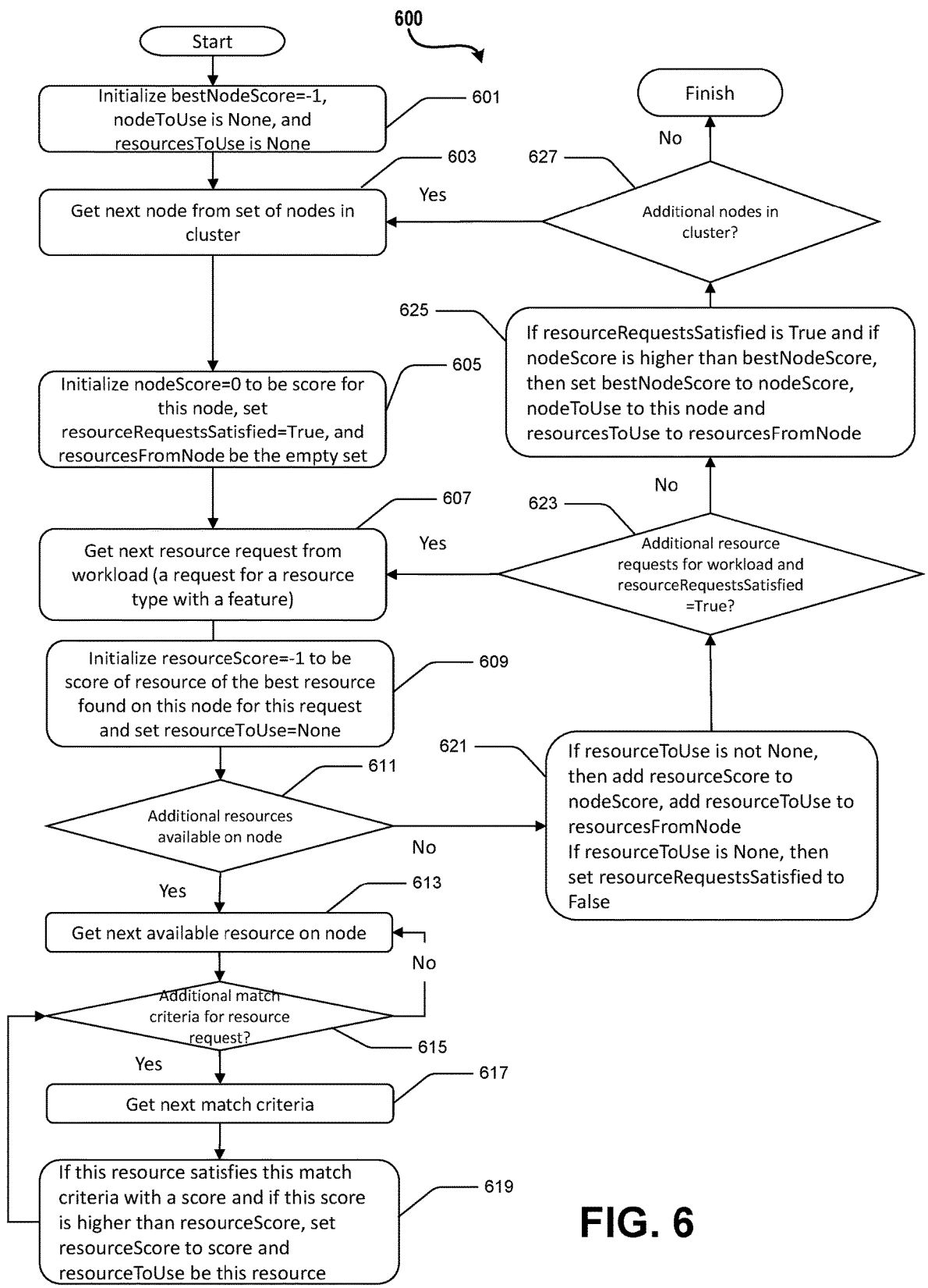
FIG. 6 illustrates an example implementation in accordance with the present disclosure.

This advertisement can be written into node annotations. The requests can be generated using a modified request, as shown in the example code block above. This request can be generated by annotating the pod. The scheduler plugin then implements Algorithm 1 to find the node and the corresponding resources. Algorithm 1 is illustrated in FIG. 6. FIG. 6 illustrates a process 600 to schedule a workload with complicated requests (resource requests can be represented as a count of resources needed with particular features (for example two CPUs with feature A). If so, this can be represented as repeated identical requests (for example 2 requests for CPUs with feature A). Similar to the overlapping resource sets, this allocation can be written into pod annotations to be used by the custom CRI.

Referring to FIG. 6, operation 601 illustrates initializing bestNodeScore=−1, nodeToUse to None, and resourcesToUse to None. Operation 603 illustrates retrieving the next node from a set of nodes in the cluster.

Operation 605 illustrates initializing nodeScore=0 to be the score for this node, setting resourceRequestsSatisfied=True, and setting resourcesFromNode to be the empty set. Operation 607 illustrates retrieving the next resource request from a workload (a request for a resource type with a feature).

Operation 609 illustrates initializing resourceScore=−1 to be the score of the resource of the best resource found on this node for this request and setting resource ToUse=None.

Operation 611 illustrates determining if additional resources are available on the node. If additional resources are not available on the node, then operation 611 is followed by operation 621. If additional resources with this feature are available on the node, then operation 611 is followed by operation 613 which illustrates retrieving the next available resource on the node.

Operation 615 illustrates determining if there are additional match criteria for the resource request. If there are no additional match criteria for the resource request, then operation 615 is followed by operation 613. If there are additional match criteria for the resource request, then operation 615 is followed by operation 617 which illustrates retrieving the next match criteria.

Operation 619 illustrates that if this resource satisfies this match criteria with a score and if this score is higher than resourceScore, then resourceScore is set to the score and resourceToUse is set to this resource.

Operation 621 illustrates that if resourceToUse is not None, then add resourceScore to nodeScore, add resourceToUse to resourcesFromNode; and if resourceToUse is None, then set resourceRequestsSatisfied to False.

Operation 623 illustrates determining if there are additional resource requests for the workload and resourceRequestsSatisfied=True. If there are additional resource requests for the workload and resourceRequestsSatisfied=True, then operation 623 is followed by operation 607. Otherwise, operation 623 is followed by operation 625 which illustrates that if resourceRequestsSatisfied is True and if nodeScore is higher than bestNodeScore, then set bestNodeScore to nodeScore, set nodeToUse to this node, and set resourcesToUse to resourcesFromNode.

Operation 627 illustrates determining if there are additional nodes in the cluster. If there are additional nodes in the cluster, then operation 627 is followed by operation 603. If there are no additional nodes in the cluster, then the procedure completes.

Although the device plugin and scheduling plugin extensions can be used to partition and account for each type of resource independently, a framework to isolate devices and resources can be implemented so that containers cannot use resources which have not been assigned to it. The default container runtime does not have functionality to accomplish this when a container launches. In addition, for fully configurable resources, there may be resource configurations which the container runtime does not allow for. In an embodiment, the system is extended by utilizing a custom runtime which intercepts the default runtime when a container is instantiated. At this point, the container configuration is examined and modified so that device and resource visibility is limited. In addition, any resources being used by the container can be configured.

Additionally, the container runtime modifications can be used to ensure that the devices assigned by the scheduler plugin are being utilized. Furthermore, instead of writing a full custom runtime, hooks can be added to the existing container runtime.

In an embodiment, the following is implemented on a node when a container is instantiated:

1. Container orchestration system daemon (e.g., kubelet) generates a configuration file which specifies CPU limits, CPU visibility, device mounts, etc. In an example, some specifications (such as CPU limits and visibility) are implemented on LINUX using LINUX cgroups.
2. Container orchestration system daemon calls a runtime as a binary which starts the container. This runtime is typically Open Container Initiative (OCI) compliant and thus complies to a standards-based API.
3. The CRI then calls the binary runc, passing the configuration file from (1).

A script can be implemented which has the same API as the call to runc, intercept the call to runc, and then modify the config file. These modifications can then in turn modify resource/device visibility and CPU visibility as well run any custom resource configuration prior to launching the container.

To utilize the device inside the container, the container identifies which resources/devices have been assigned to the container. This can be done via environment variables which are set by both the device plugin as well as the custom runtime configuration modification.

The container typically launches a binary which uses a configuration file containing values for various devices to use. These values can be, for example, PCI bus addresses of the device, network interface names, IP addresses, MAC addresses, etc.

Code can be implemented to modify this configuration file using a script. The script can either (1) be a container hook which launches prior to container start, by inserting an init container which has a script to modify the configuration file, or (2) by directly modifying the entry point of the container to launch the script. If the configuration file used by the container is standardized (e.g., in the case for open RAN (O-RAN)), then this modification may be implemented automatically.

The disclosed embodiments enable partitioning of resources/devices into different classes for resource scheduling purposes using a feature or characteristic. CPUs in particular can be partitioned into isolcpus and non-isolcpus. CPUs can be further partitioned depending on the allowable p-state, c-state, or systemd slices for the core.

The disclosed embodiments enable a resource to belong to several classes where the set of classes allowed for one resource may overlap with that of another resource, and advertisement of the resource in all classes to which it belongs (e.g., using the device plugin). Resources can be accounted for by reducing the availability of each class to which a resource belongs when a resource is assigned to a container (e.g., using the scheduler plugin extensions).

The disclosed embodiments further enable resource isolation by limiting the visibility of CPUs and devices inside the container (e.g., by intercepting the call to create a container). As disclosed herein, a container start hook can be inserted by intercepting the call to create the container. The container start hook can be used to configure resources prior to container start (e.g., configuring the accelerator parameters). Additionally, configuration files can be automatically modified to account for resources and custom environment being assigned to the container.

Figure 7:
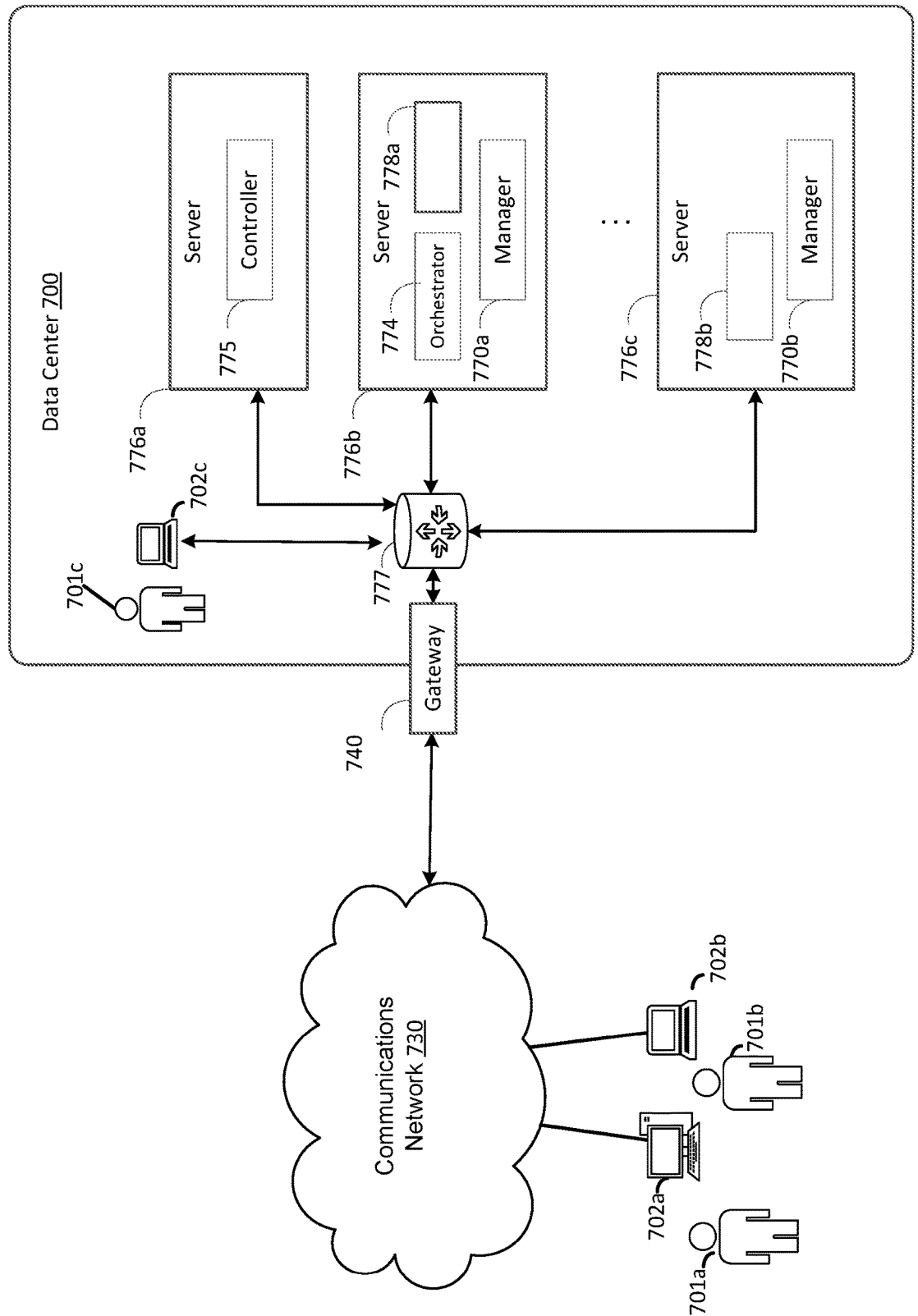
FIG. 7 is a diagram illustrating a data center in accordance with the present disclosure.

FIG. 7 illustrates one example of a general computing environment in which the embodiments described herein may be implemented. FIG. 7 illustrates a data center 700 that is configured to provide computing resources to users 701a, 701b, or 701c (which may be referred herein singularly as "a user 701" or in the plural as "the users 701") via user computers 702a, 702b, and 702c (which may be referred herein singularly as "a computer 702" or in the plural as "the computers 702") via a communications network 730. The computing resources provided by the data center 700 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 700 may include servers 776a, 776b, and 776c (which may be referred to herein singularly as "a server 776" or in the plural as "the servers 776") that provide computing resources available as virtual machines or containers 778a and 778b (which may be referred to herein singularly as "a virtual machine 778" or in the plural as "the virtual machines 778" or as "a container 778" or in the plural as "the containers 778"). The virtual machines or containers 778 may be configured to execute applications such as Web servers, application servers, media servers, database servers, and the like. Other resources that may be provided include data storage resources (not shown on FIG. 7) and may include file storage devices, block storage devices, and the like. Servers 776 may also execute functions that manage and control allocation of resources in the data center, such as a controller 775. Controller 775 may be a fabric controller or another type of program configured to manage the allocation of virtual machines or containers on servers 776.

Referring to FIG. 7, communications network 730 may, for example, be a publicly accessible network of linked networks and may be operated by various entities, such as the Internet. In other embodiments, communications network 730 may be a private network, such as a corporate network that is wholly or partially inaccessible to the public.

Communications network 730 may provide access to computers 702. Computers 702 may be computers utilized by users 701. Computer 702a, 702b or 702c may be a server, a desktop or laptop personal computer, a tablet computer, a smartphone, a set-top box, or any other computing device capable of accessing data center 700. User computer 702a or 702b may connect directly to the Internet (e.g., via a cable modem). User computer 702c may be internal to the data center 700 and may connect directly to the resources in the data center 700 via internal networks. Although only three user computers 702a, 702b, and 702c are depicted, it should be appreciated that there may be multiple user computers.

Computers 702 may also be utilized to configure aspects of the computing resources provided by data center 700. For example, data center 700 may provide a Web interface through which aspects of its operation may be configured through the use of a Web browser application program executing on user computer 702. Alternatively, a stand-alone application program executing on user computer 702 may be used to access an application programming interface (API) exposed by data center 700 for performing the configuration operations.

Servers 776 may be configured to provide the computing resources described above. One or more of the servers 776 may be configured to execute a manager 770a or 770b (which may be referred herein singularly as "a manager 770" or in the plural as "the managers 770") configured to execute the virtual machines. The managers 770 may be a virtual machine monitor (VMM), fabric controller, or another type of program configured to enable the execution of virtual machines or containers 778 on servers 776, for example. One or more of the servers 776 may be configured to execute an orchestrator 774 for deploying and managing containerized applications. Orchestrator 774 sets up, monitors, and tears down containers and VMs, as well as ensure that hardware resources are assigned to each of the containers or VMs.

It should be appreciated that although the embodiments disclosed above are discussed in the context of virtual machines and containers, other types of implementations can be utilized with the concepts and technologies disclosed herein.

In the example data center 700 shown in FIG. 7, a network device 777 may be utilized to interconnect the servers 776a and 776b. Network device 777 may comprise one or more switches, routers, or other network devices. Network device 777 may also be connected to gateway 740, which is connected to communications network 730. Network device 777 may facilitate communications within networks in data center 700, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIGS. 1-7 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF). The disclosed embodiments can be implemented in a 5G computing cluster comprising a plurality of computing nodes hosting a plurality of containers executing one or more network functions of the 5G computing cluster. An orchestrator executing in the 5G computing cluster may implemented some or all of the disclosed functionality.

Figure 8:
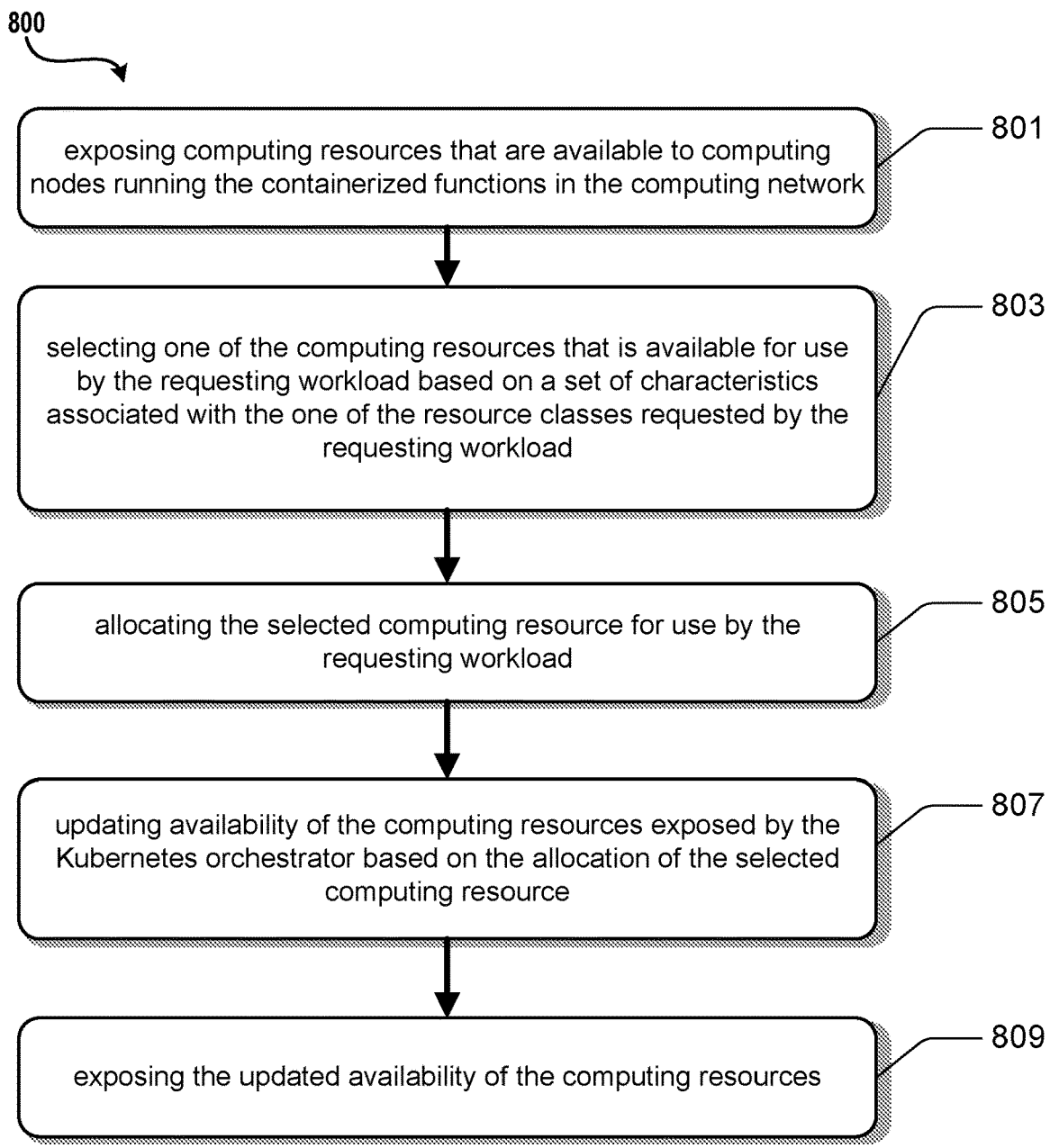
FIG. 8 is a flowchart depicting an example procedure for performing operations in a Kubernetes environment in accordance with the present disclosure.

Turning now to FIG. 8, illustrated is an example operational procedure for managing, by an orchestrator configured to deploy and manage containerized functions in a computing network, a plurality of computing resources for allocation to workloads executing in the containerized functions in accordance with the present disclosure. In an embodiment, the orchestrator may be a Kubernetes orchestrator. Such an operational procedure can be provided by one or more components illustrated in FIGS. 1-7. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 800 is described as running on a system, it can be appreciated that the routine 800 and other operations described herein can be executed on an individual computing device or several devices.

Referring to FIG. 8, operation 801 illustrates exposing, by the orchestrator, the computing resources that are available to computing nodes running the containerized functions in the computing network. In an embodiment, the computing resources are grouped into resource classes. In an embodiment, each of the resource classes are associated with a set of characteristics. In an embodiment, the characteristics include whether an associated resource is isolated or non-isolated. In an embodiment, at least some of the computing resources have overlapping characteristics.

Operation 803 illustrates in response to receiving, from a workload running in one of the containerized functions, a request to use one of the resource classes, selecting one of the computing resources that is available for use by the requesting workload based on a set of characteristics associated with the one of the resource classes requested by the requesting workload. In an embodiment, the one computing resource is selected to maximize availability of non-selected computing resources based on the overlapping characteristics of the computing resources.

Operation 805 illustrates allocating the selected computing resource for use by the requesting workload. In an embodiment, the selected computing resource is allocated for use by the requesting workload in accordance with the set of characteristics associated with the one of the resource classes.

Operation 807 illustrates updating availability of the computing resources exposed by the orchestrator based on the allocation of the selected computing resource. In an embodiment, the availability of the computing resources is modified so that the selected computing resource is not available for use by other workloads of the containerized functions and that overlapping characteristics of the selected computing resource are not available for use by the other workloads.

Operation 809 illustrates exposing the updated availability of the computing resources.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 700 illustrated in FIG. 7, which are configured to host physical and/or virtualized computer servers, storage devices, networking equipment and the like, that may be used to implement and distribute the infrastructure and services offered by the service provider.

Figure 9:
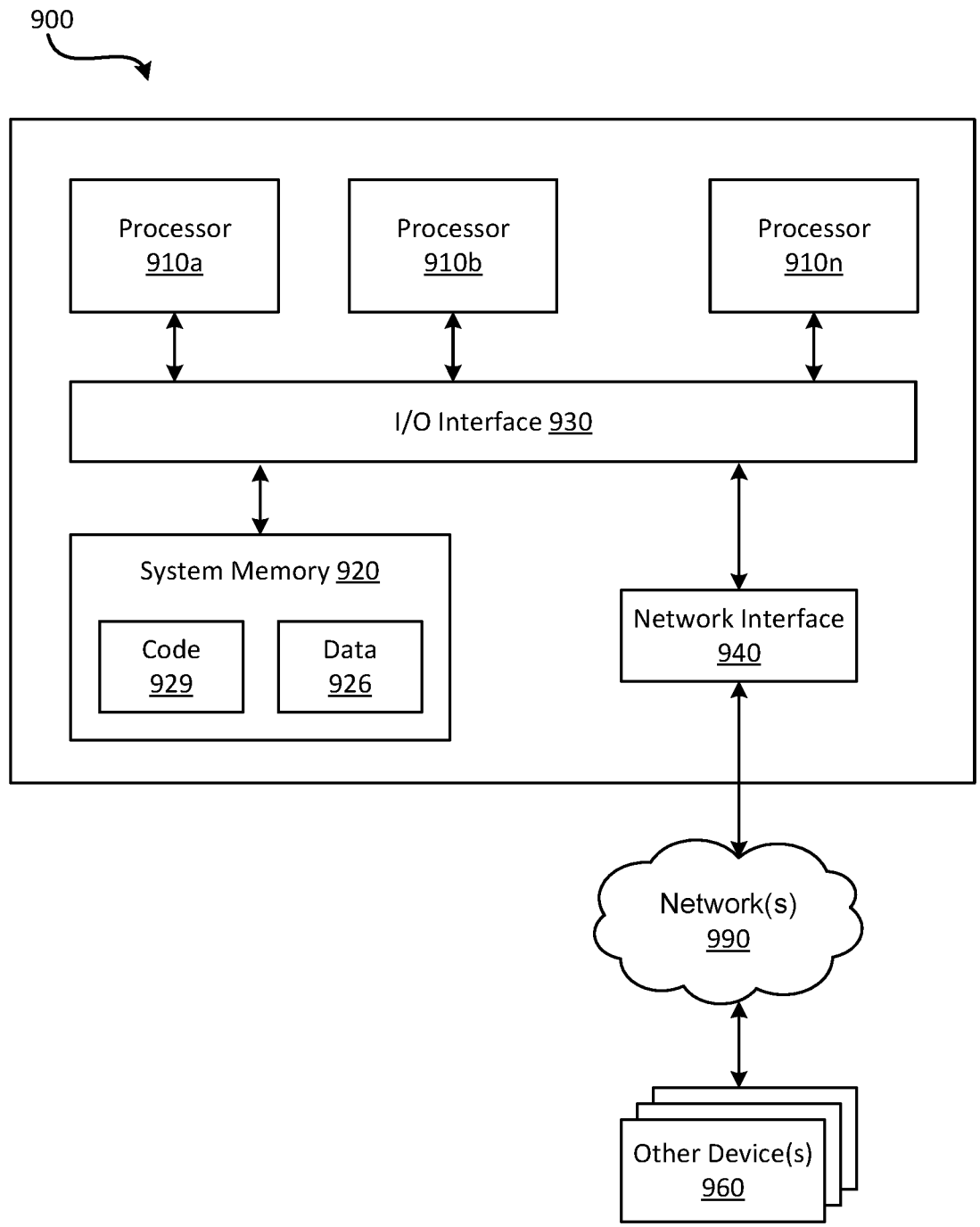
FIG. 9 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910*a*, 910*b*, and/or 910*n* (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 929 and data 926.

In one embodiment, I/O interface 930 may be configured to coordinate I/O traffic between the processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 990, such as other computer systems or devices as illustrated in FIGS. 1 through 8, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms: furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing, by a Kubernetes orchestrator configured to deploy and manage containerized functions in a computing network, a plurality of computing resources for allocation to workloads executing in the containerized functions, the method comprising:

exposing, by the Kubernetes orchestrator, the computing resources that are available to computing nodes running the containerized functions in the computing network, wherein the computing resources are grouped into resource classes, wherein each of the resource classes are associated with a set of characteristics, the characteristics including whether an associated resource is isolated or non-isolated, and wherein at least some of the computing resources have overlapping characteristics;

in response to receiving, from a workload running in one of the containerized functions, a request to use one of the resource classes:

selecting one of the computing resources that is available for use by the requesting workload based on a set of characteristics associated with the one of resource classes requested by the requesting workload, wherein the one computing resource is selected to maximize availability of non-selected computing resources based on the overlapping characteristics of the computing resources;

allocating the selected computing resource for use by the requesting workload, wherein the selected computing resource is allocated for use by the requesting workload in accordance with the set of characteristics associated with the one of the resource classes;

updating availability of the computing resources exposed by the Kubernetes orchestrator based on the allocation of the selected computing resource, wherein the availability of the computing resources is modified so that the selected computing resource is not available for use by other workloads of the containerized functions and that overlapping characteristics of the selected computing resource are not available for use by the other workloads; and exposing the updated availability of the computing resources.

Clause 2: The method of clause 1, wherein the computing resources comprise central processing units (CPUs) that are assigned into non-overlapping isolated CPUs and non-isolated CPU resource classes.

Clause 3: The method of any of clauses 1-2, wherein the CPUs are further assigned to the resource classes based on p-state, c-state, or systemd slices.

Clause 4: The method of any of clauses 1-3, wherein the computing resources are assigned to belong to more than one resource class.

Clause 5: The method of any of clauses 1-4, further comprising using a device plugin on the computing nodes to advertise availability of the computing resources.

Clause 6: The method of any of clauses 1-5, further comprising using a scheduler plugin extension and a score function to:

assign the workloads to the computing nodes;

determine which of the computing resources to satisfy the request; and update the availability of the computing resources.

Clause 7: The method of clauses 1-6, further comprising limiting visibility of the computing resources to containers running on the computing nodes in the computing network by intercepting calls to create the containers and updating a configuration of the containers.

Clause 8: The method of any of clauses 1-7, wherein the configuration is updated by using a container start hook.

Clause 9: The method of any of clauses 1-8, further comprising using the container start hook to configure parameters of the computing resources.

Clause 10: A method for managing computing resources in a 5G computing cluster comprising a plurality of computing nodes hosting a plurality of containers executing one or more network functions of the 5G computing cluster, the method performed by an orchestrator executing in the 5G computing cluster, the method comprising:

exposing the computing resources to computing nodes running the network functions in the 5G computing cluster, wherein the computing resources are grouped into resource classes, wherein each of the resource classes are associated with a set of characteristics, the characteristics including whether an associated resource is isolated or non-isolated, and wherein at least some of the computing resources have overlapping characteristics;

in response to receiving, from a network function running in one of the containers, a request to use one of the resource classes:

selecting one of the computing resources that is available for use by the requesting network function based on a set of characteristics associated with the one of resource classes requested by the requesting network function, wherein the one computing resource is selected to maximize availability of non-selected computing resources based on the overlapping characteristics of the computing resources;

allocating the selected computing resource for use by the requesting network function, wherein the selected computing resource is allocated for use by the requesting network function in accordance with the set of characteristics associated with the one of the resource classes;

updating availability of the computing resources exposed by the orchestrator based on the allocation of the selected computing resource, wherein the availability of the computing resources is modified so that the selected computing resource is not available for use by other network functions and that overlapping characteristics of the selected computing resource are not available for use by the other network functions; and exposing the updated availability of the computing resources.

Clause 11: The system of clause 10, wherein the computing resources are assigned to belong to more than one resource class.

Clause 12: The system of any of clauses 10 and 11, further comprising using a device plugin of the orchestrator to advertise availability of the computing resources to the computing nodes.

Clause 13: The system of any clauses 10-12, further comprising using a scheduler plugin extension and a score function to update the assignment of the computing resources.

Clause 14: The system of any clauses 10-13, further comprising limiting visibility of the computing resources to containers running on the computing nodes in the 5G computing cluster by intercepting calls to create the containers and updating a configuration of the containers.

Clause 15: The system of any clauses 10-14, wherein the configuration is updated by using a container start hook.

Clause 16: A computer-readable storage medium having computer-executable instructions stored thereupon which, when executed by one or more processors of a computing device, cause the computing device to:

identifying computing resources that are available for use by workloads to be executed in a computing network;

grouping the resources into resource classes, wherein each of the resource classes are associated with a set of characteristics, wherein at least some of the computing resources have overlapping characteristics;

based on the grouping of the resources to the resource classes, exposing the resources to an orchestrator in the computing network;

in response to receiving a request from one of the workloads to use one of the resources:

selecting one of the computing resources that is available for use by the requesting workload based on a set of characteristics associated with the one of resource classes requested by the requesting workload, wherein the one computing resource is selected to maximize availability of non-selected computing resources based on the overlapping characteristics of the computing resources;

allocating the selected computing resource for use by the requesting workload, wherein the selected computing resource is allocated for use by the requesting workload in accordance with the set of characteristics associated with the one of the resource classes;

updating availability of the computing resources based on the allocation of the selected computing resource, wherein the availability of the computing resources is modified so that the selected computing resource is not available for use by other workloads and that overlapping characteristics of the selected computing resource are not available for use by the other workloads; and exposing the updated availability of the computing resources.

Clause 17: The computer-readable storage medium of clause 16, wherein the computing resources comprise CPUs that are assigned into non-overlapping isolated CPUs and non-isolated CPU resource classes.

Clause 18: The computer-readable storage medium of any of clauses 16 and 17, wherein the CPUs are further assigned to the resource classes based on p-state, c-state, or systemd slices.

Clause 19: The computer-readable storage medium of any of the clauses 16-18, further comprising computer-executable instructions stored thereupon which, when executed by one or more processors of a computing device, cause the computing device to perform operations comprising using a device plugin to advertise availability of the computing resources.

Clause 20: The computer-readable storage medium of any of the clauses 16-19, further comprising computer-executable instructions stored thereupon which, when executed by one or more processors of a computing device, cause the computing device to perform operations comprising using a scheduler plugin extension and a score function to update the assignment of the computing resources.

What is claimed is:

1. A method for managing, by a Kubernetes orchestrator configured to deploy and manage containerized functions in a computing network, a plurality of computing resources for allocation to workloads executing in the containerized functions, the method comprising:
    exposing, by the Kubernetes orchestrator, the computing resources that are available to computing nodes running the containerized functions in the computing network, wherein the computing resources are grouped into resource classes, wherein each of the resource classes are associated with a set of characteristics, the characteristics including whether an associated resource is isolated or non-isolated, and wherein at least some of the computing resources have overlapping characteristics;
    in response to receiving, from a workload running in one of the containerized functions, a request to use one of the resource classes:
        selecting one of the computing resources that is available for use by the requesting workload based on a set of characteristics associated with the one of the resource classes requested by the requesting workload, wherein the one computing resource is selected to maximize availability of non-selected computing resources based on the overlapping characteristics of the computing resources;
        allocating the selected computing resource for use by the requesting workload, wherein the selected computing resource is allocated for use by the requesting workload in accordance with the set of characteristics associated with the one of the resource classes;
        updating availability of the computing resources exposed by the Kubernetes orchestrator based on the allocation of the selected computing resource, wherein the availability of the computing resources is modified so that the selected computing resource is not available for use by other workloads of the containerized functions and that overlapping characteristics of the selected computing resource are not available for use by the other workloads; and
        exposing the updated availability of the computing resources.

2. The method of claim 1, wherein the computing resources comprise central processing units (CPUs) that are assigned into non-overlapping isolated CPUs and non-isolated CPU resource classes.

3. The method of claim 2, wherein the CPUs are further assigned to the resource classes based on p-state, c-state, or systemd slices.

4. The method of claim 1, wherein the computing resources are assigned to belong to more than one resource class.

5. The method of claim 1, further comprising using a device plugin on the computing nodes to advertise availability of the computing resources.

6. The method of claim 1, further comprising using a scheduler plugin extension and a score function to:
    assign the workloads to the computing nodes;
    determine which of the computing resources to satisfy the request; and
    update the availability of the computing resources.

7. The method of claim 1, further comprising limiting visibility of the computing resources to containers running on the computing nodes in the computing network by intercepting calls to create the containers and updating a configuration of the containers.

8. The method of claim 7, wherein the configuration is updated by using a container start hook.

9. The method of claim 8, further comprising using the container start hook to configure parameters of the computing resources.

10. A method for managing computing resources in a 5G computing cluster comprising a plurality of computing nodes hosting a plurality of containers executing one or more network functions of the 5G computing cluster, the method performed by an orchestrator executing in the 5G computing cluster, the method comprising:
    exposing the computing resources to computing nodes running the network functions in the 5G computing cluster, wherein the computing resources are grouped into resource classes, wherein each of the resource classes are associated with a set of characteristics, the characteristics including whether an associated resource is isolated or non-isolated, and wherein at least some of the computing resources have overlapping characteristics;
    in response to receiving, from a network function running in one of the containers, a request to use one of the resource classes:
        selecting one of the computing resources that is available for use by the requesting network function based on a set of characteristics associated with the one of the resource classes requested by the requesting network function, wherein the one computing resource is selected to maximize availability of non-selected computing resources based on the overlapping characteristics of the computing resources;
        allocating the selected computing resource for use by the requesting network function, wherein the selected computing resource is allocated for use by the requesting network function in accordance with the set of characteristics associated with the one of the resource classes;
        updating availability of the computing resources exposed by the orchestrator based on the allocation of the selected computing resource, wherein the availability of the computing resources is modified so that the selected computing resource is not available for use by other network functions and that overlapping characteristics of the selected computing resource are not available for use by the other network functions; and
        exposing the updated availability of the computing resources.

11. The method of claim 10, wherein the computing resources are assigned to belong to more than one resource class.

12. The method of claim 10, further comprising using a device plugin of the orchestrator to advertise availability of the computing resources to the computing nodes.

13. The method of claim 10, further comprising using a scheduler plugin extension and a score function to update the assignment of the computing resources.

14. The method of claim 10, further comprising limiting visibility of the computing resources to containers running on the computing nodes in the 5G computing cluster by intercepting calls to create the containers and updating a configuration of the containers.

15. The method of claim 14, wherein the configuration is updated by using a container start hook.

16. A computer-readable storage medium having computer-executable instructions stored thereupon which, when executed by one or more processors of a computing device, cause the computing device to perform operations comprising:

identifying computing resources that are available for use by workloads to be executed in a computing network;

grouping the resources into resource classes, wherein each of the resource classes are associated with a set of characteristics, wherein at least some of the computing resources have overlapping characteristics;

based on the grouping of the resources to the resource classes, exposing the resources to an orchestrator in the computing network;

in response to receiving a request from one of the workloads to use one of the resources:

selecting one of the computing resources that is available for use by the requesting workload based on a set of characteristics associated with the one of the resource classes requested by the requesting workload, wherein the one computing resource is selected to maximize availability of non-selected computing resources based on the overlapping characteristics of the computing resources;

allocating the selected computing resource for use by the requesting workload, wherein the selected computing resource is allocated for use by the requesting workload in accordance with the set of characteristics associated with the one of the resource classes;

updating availability of the computing resources based on the allocation of the selected computing resource, wherein the availability of the computing resources is modified so that the selected computing resource is not available for use by other workloads and that overlapping characteristics of the selected computing resource are not available for use by the other workloads; and exposing the updated availability of the computing resources.

17. The computer-readable storage medium of claim 16, wherein the computing resources comprise CPUs that are assigned into non-overlapping isolated CPUs and non-isolated CPU resource classes.

18. The computer-readable storage medium of claim 17, wherein the CPUs are further assigned to the resource classes based on p-state, c-state, or systemd slices.

19. The computer-readable storage medium of claim 16, further comprising computer-executable instructions stored thereupon which, when executed by one or more processors of a computing device, cause the computing device to perform operations comprising using a device plugin to advertise availability of the computing resources.

20. The computer-readable storage medium of claim 19, further comprising computer-executable instructions stored thereupon which, when executed by one or more processors of a computing device, cause the computing device to perform operations comprising using a scheduler plugin extension and a score function to update the assignment of the computing resources.

* * * * *